United States Patent
Waite

(10) Patent No.: US 10,156,147 B2
(45) Date of Patent: Dec. 18, 2018

(54) METHOD AND APPARATUS FOR COOLING GAS TURBINE ENGINE COMPONENT

(71) Applicant: UNITED TECHNOLOGIES CORPORATION, Farmington, CT (US)

(72) Inventor: Ryan Alan Waite, Glastonbury, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 338 days.

(21) Appl. No.: 14/974,150

(22) Filed: Dec. 18, 2015

(65) Prior Publication Data

US 2017/0175551 A1    Jun. 22, 2017

(51) Int. Cl.
*F01D 5/18* (2006.01)
*F01D 9/02* (2006.01)
(Continued)

(52) U.S. Cl.
CPC .......... *F01D 5/189* (2013.01); *F01D 5/188* (2013.01); *F01D 9/02* (2013.01); *F01D 11/10* (2013.01); *F01D 25/12* (2013.01); *F02C 7/12* (2013.01); *F05D 2220/32* (2013.01); *F05D 2240/11* (2013.01); *F05D 2260/20* (2013.01); *F05D 2260/201* (2013.01); *F05D 2260/202* (2013.01); *Y02T 50/676* (2013.01)

(58) Field of Classification Search
CPC . F01D 5/189; F01D 9/02; F01D 9/023; F01D 25/12; F02C 7/12

USPC .......... 415/115, 208.1; 416/95, 96 R, 97 R, 416/96 A
See application file for complete search history.

(56) References Cited

U.S. PATENT DOCUMENTS 3,973,874 A    8/1976    Corsmeier et al.
4,025,226 A    5/1977    Hovan
(Continued)

FOREIGN PATENT DOCUMENTS

EP    2236751    10/2010
EP    2947272    11/2015
(Continued)

OTHER PUBLICATIONS

The Extended European Search Report for EP Application No. 16204870.6, dated Apr. 19, 2017.

*Primary Examiner* — Timothy L Maust
(74) *Attorney, Agent, or Firm* — Carlson, Gaskey & Olds, P.C.

(57) ABSTRACT

According to one aspect of the present disclosure, an engine component for a gas turbine engine is disclosed that includes an internal cavity and a baffle. The internal cavity is defined by the engine component, and the internal cavity is in fluid communication with a source of cooling air. The baffle is disposed within the internal cavity, and includes at least four longitudinal sidewalls that include at least two first sidewalls, one of which is upstream and one of which is downstream, and at least two second sidewalls, at least one of which faces towards a core flow path of the gas turbine engine. The baffle includes a plurality of openings for directing cooling air from within the baffle into the cavity. A majority of the openings are on at least one of the first sidewalls.

23 Claims, 8 Drawing Sheets

(51) Int. Cl.
  *F01D 25/12*   (2006.01)
  *F02C 7/12*    (2006.01)
  *F01D 11/10*   (2006.01)

(56) References Cited

U.S. PATENT DOCUMENTS

| | | | |
|---|---|---|---|
| 4,063,851 A | 12/1977 | Weldon | |
| 4,573,865 A * | 3/1986 | Hsia | F01D 5/187 |
| | | | 165/109.1 |
| 5,120,192 A * | 6/1992 | Ohtomo | F01D 5/189 |
| | | | 415/115 |
| 5,207,556 A | 5/1993 | Frederick et al. | |
| 5,391,052 A | 2/1995 | Correia et al. | |
| 6,126,389 A * | 10/2000 | Burdgick | F01D 11/24 |
| | | | 415/115 |
| 6,164,914 A | 12/2000 | Correia et al. | |
| 6,193,465 B1 | 2/2001 | Liotta et al. | |
| 7,597,533 B1 * | 10/2009 | Liang | F01D 9/02 |
| | | | 415/116 |
| 8,109,724 B2 | 2/2012 | Malecki et al. | |
| 8,152,468 B2 | 4/2012 | Propheter-Hinckley et al. | |
| 8,348,613 B2 * | 1/2013 | Gregg | F01D 5/189 |
| | | | 415/1 |
| 8,707,712 B2 | 5/2014 | Spangler et al. | |
| 9,353,631 B2 * | 5/2016 | Spangler | F01D 5/186 |
| 9,797,261 B2 * | 10/2017 | Tibbott | F01D 5/188 |
| 2008/0317585 A1 | 12/2008 | Lee et al. | |
| 2009/0246023 A1 | 10/2009 | Chon et al. | |
| 2010/0054915 A1 | 3/2010 | Devore et al. | |
| 2013/0078084 A1 | 3/2013 | Gendrich et al. | |
| 2013/0023987 A1 | 8/2013 | Stafford et al. | |
| 2014/0075947 A1 * | 3/2014 | Gautschi | F01D 5/189 |
| | | | 60/726 |
| 2016/0153299 A1 * | 6/2016 | Tuertscher | F01D 5/14 |
| | | | 415/115 |
| 2017/0044906 A1 * | 2/2017 | Mongillo | F01D 5/188 |
| 2017/0058679 A1 * | 3/2017 | Spangler | B23P 15/02 |
| 2017/0175578 A1 * | 6/2017 | Propheter-Hinckley | |
| | | | F01D 25/12 |

FOREIGN PATENT DOCUMENTS

| | | |
|---|---|---|
| WO | 2015023338 | 2/2015 |
| WO | 2015109040 | 7/2015 |

* cited by examiner

METHOD AND APPARATUS FOR COOLING GAS TURBINE ENGINE COMPONENT

BACKGROUND

This disclosure relates to gas turbine engines, and more particularly to a method and apparatus for cooling a gas turbine engine component.

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

The turbine section includes components such as turbine vanes and blade outer air seals that are subjected to high temperatures during engine operation. To cool such components, internal baffle inserts have been used to create impingement plates or thin passages for cooling a hotter outer wall (e.g., within an airfoil). A plenum of air exists inside the baffle, which typically has small holes that align with the surface to be cooled. The cooling air passes from the plenum through the small holes, impinging on the hot surface, generating increased heat transfer. The baffle holes have been perpendicular to the hot surface being cooled.

SUMMARY

One example embodiment of an engine component for a gas turbine engine includes an internal cavity and a baffle. The internal cavity is defined by the engine component, and is in fluid communication with a source of cooling air. The baffle is disposed within the internal cavity. The baffle includes at least four longitudinal sidewalls that include at least two first sidewalls, one of which is upstream and one of which is downstream, and at least two second sidewalls, at least one of which faces towards a core flow path of the gas turbine engine. The baffle includes a plurality of openings for directing cooling air from within the baffle into the cavity. A majority of the openings are on at least one of the first sidewalls.

In another example embodiment of the above described engine component, at least 90% of the openings are on at least one of the first sidewalls.

In another example embodiment of any of the above described engine components, all of the openings are on at least one of the first sidewalls, and the second sidewalls are free of the openings.

In another example embodiment of any of the above described engine components, the engine component is an airfoil, each of the two first sidewalls extends along a respective direction having a major component between suction and pressure sides of the airfoil, and each of the two second sidewalls extends along a respective direction having major component between a leading edge and a trailing edge of the airfoil.

In another example embodiment of any of the above described engine components, a pressure side of the airfoil includes a plurality of exit holes that define passages for air to exit the internal cavity.

In another example embodiment of any of the above described engine components, the airfoil is a turbine vane.

In another example embodiment of any of the above described engine components, the engine component is a blade outer air seal adjacent to an airfoil; the two first sidewalls face towards a leading edge side and a trailing edge side, respectively, of the airfoil; and a first one of the second sidewalls faces towards the core flow path, and a second one of the second sidewalls faces away from the core flow path. In some such embodiments, an opening is included in the second one of the second sidewalls, with the opening fluidly connecting the source of cooling air to the internal cavity.

In another example embodiment of any of the above described engine components, a plurality of dividers are situated on at least one of a wall of the cavity that at least partially defines the cavity and an exterior of the baffle, and the dividers form a plurality of chambers that direct cooling air that exits a first one the first sidewalls along the second sidewalls towards an opposing second one of the first sidewalls.

In another example embodiment of any of the above described engine components, the engine component is part of a high pressure turbine of the gas turbine engine.

One example embodiment of a gas turbine engine includes a compressor section, a combustor section, a turbine section, and a baffle. The combustor section is in fluid communication with the compressor section. The turbine section is in fluid communication with the combustor section, and includes an engine component defining an internal cavity in fluid communication with a source of cooling air. The baffle is disposed within the internal cavity. The baffle includes at least four longitudinal sidewalls that include at least two first sidewalls, one of which is upstream and one of which is downstream, and at least two second sidewalls, at least one of which faces towards a core flow path of the gas turbine engine. The baffle includes a plurality of openings for directing cooling air from within the baffle into the cavity. A majority of the openings are on at least one of the first sidewalls.

In another example embodiment of the above described gas turbine engine, at least 90% of the openings are on at least one of the first sidewalls.

In another example embodiment of any of the above described gas turbine engines, all of the openings are on at least one of the first sidewalls, and the second sidewalls are free of the openings.

In another example embodiment of any of the above described gas turbine engines, the engine component is an airfoil, each of the two first sidewalls extends along a direction having a major component between suction and pressure sides of the airfoil, and each of the two second sidewalls extends along a direction having a major component between a leading edge and a trailing edge of the airfoil.

In another example embodiment of any of the above described gas turbine engines, a pressure side of the airfoil includes a plurality of exit holes that define passages for air to exit the internal cavity.

In another example embodiment of any of the above described gas turbine engines, the airfoil is a turbine vane.

In another example embodiment of any of the above described gas turbine engines, the engine component is a blade outer air seal adjacent to an airfoil; the two first sidewalls face towards a leading edge side and a trailing edge side, respectively, of the airfoil; and a first one of the second sidewalls faces towards the core flow path, and a second one of the second sidewalls faces away from the core flow path. In some such embodiments, an opening is included in the second one of the second sidewalls, with the opening fluidly connecting the source of cooling air to the internal cavity.

In another example embodiment of any of the above described gas turbine engines, a plurality of dividers are situated on at least one of a wall of the cavity that at least partially defines the cavity and an exterior of the baffle, and the dividers form a plurality of chambers that direct cooling air that exits a first one the first sidewalls along the second sidewalls towards an opposing second one of the first sidewalls.

In another example embodiment of any of the above described gas turbine engines, the engine component is part of a high pressure turbine of the gas turbine engine.

The embodiments described above and herein may be taken independently or in any combination. Features described in connection with one embodiment are applicable to all embodiments, unless such features are incompatible. The features described above, and other features, may be best understood from the following drawings and specification

DETAILED DESCRIPTION

Figure 1:
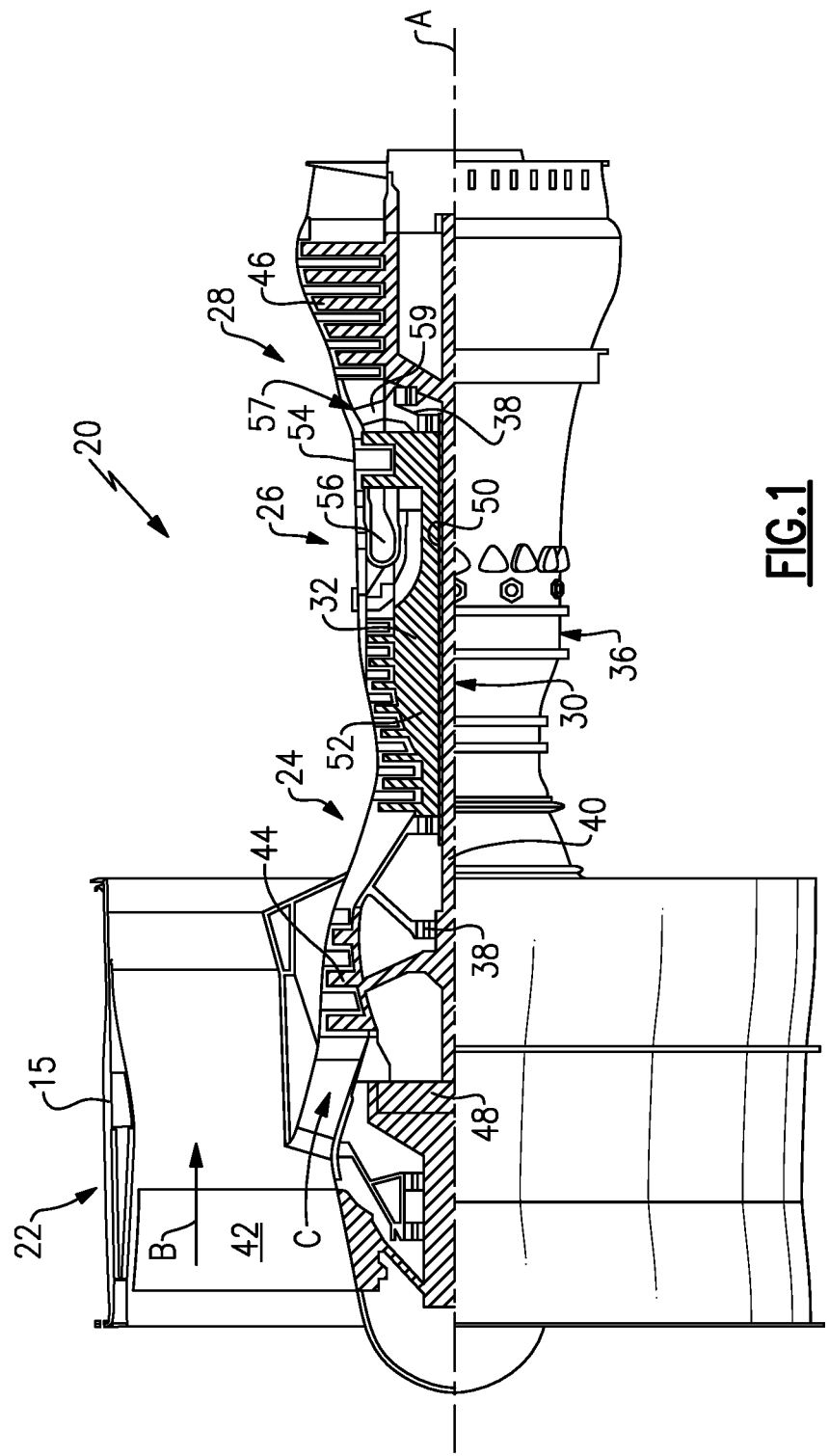
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second (350.5 meters/second).

Figure 2:
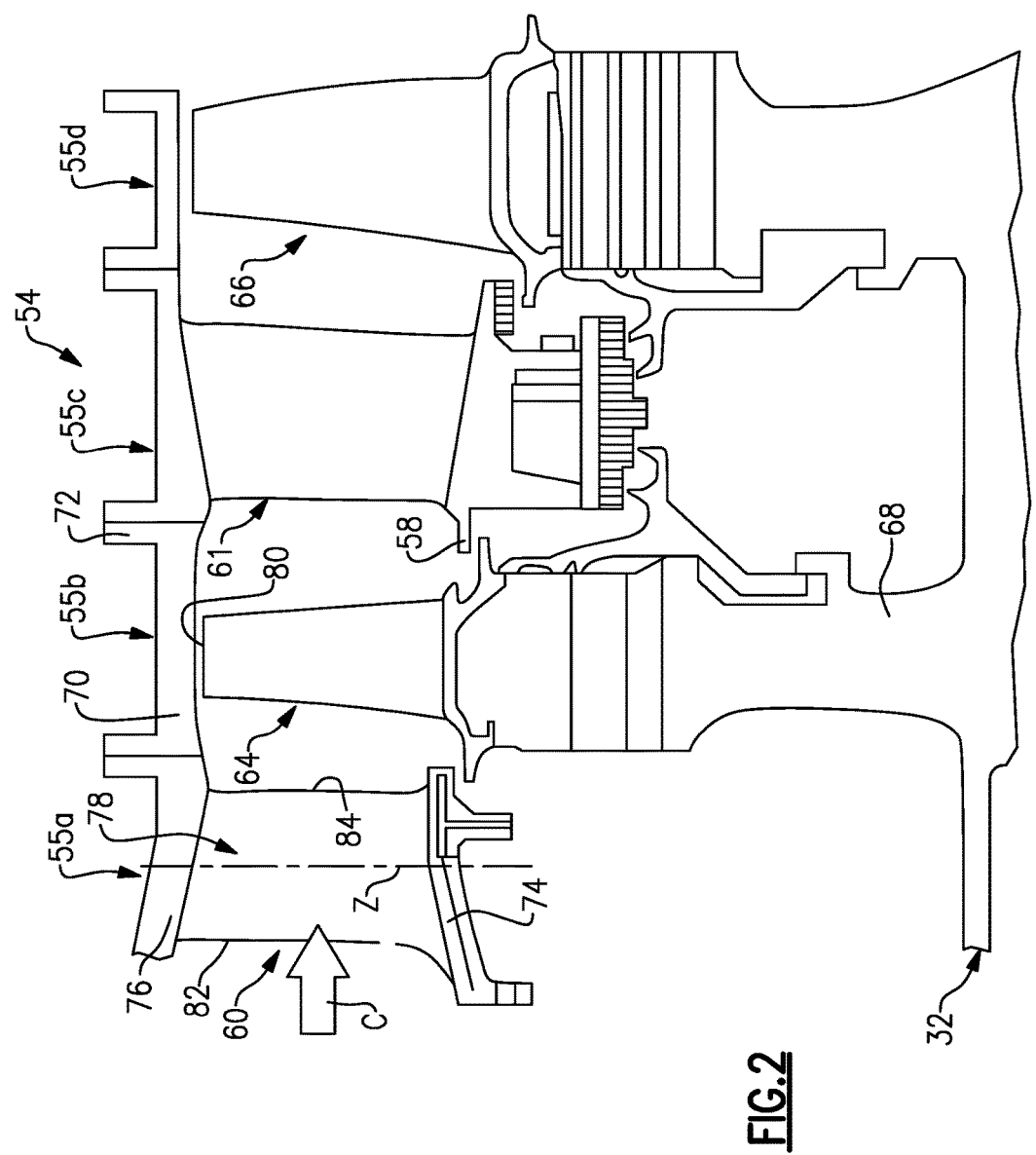
FIG. 2 is a schematic cross-sectional view through a high pressure turbine section of a gas turbine engine.

FIG. 2 is a schematic cross-sectional view through a high pressure turbine 54. In the example high pressure turbine section 54, first and second arrays 55a, 55c of circumferentially spaced fixed vanes 60, 61 are axially spaced apart from one another. A first stage array 55b of circumferentially spaced turbine blades 64, mounted to a rotor disk 68, is arranged axially between the first and second fixed vane arrays 55a, 55c. A second stage array 55d of circumferentially spaced turbine blades 66 is arranged aft of the second array 55c of fixed vanes 61. A platform 58 of the second array 55c of fixed vanes 61 is arranged in an overlapping relationship with the turbine blades 64, 66.

The turbine blades each include a tip 80 adjacent to a blade outer air seal 70 of a case structure 72. The first and second stage arrays 55a, 55c of turbine vanes and first and second stage arrays 55b, 55d of turbine blades are arranged within the core flow path C and are operatively connected to a spool 32. Each vane 60 includes an inner platform 74 and an outer platform 76 respectively defining inner and outer flow paths. The platforms 74, 76 are interconnected by an airfoil 78 extending in a radial direction Z. It should be understood that the turbine vanes may be discrete from one another or arranged in integrated clusters. The airfoil 78 has leading and trailing edges 82, 84.

Figure 3:
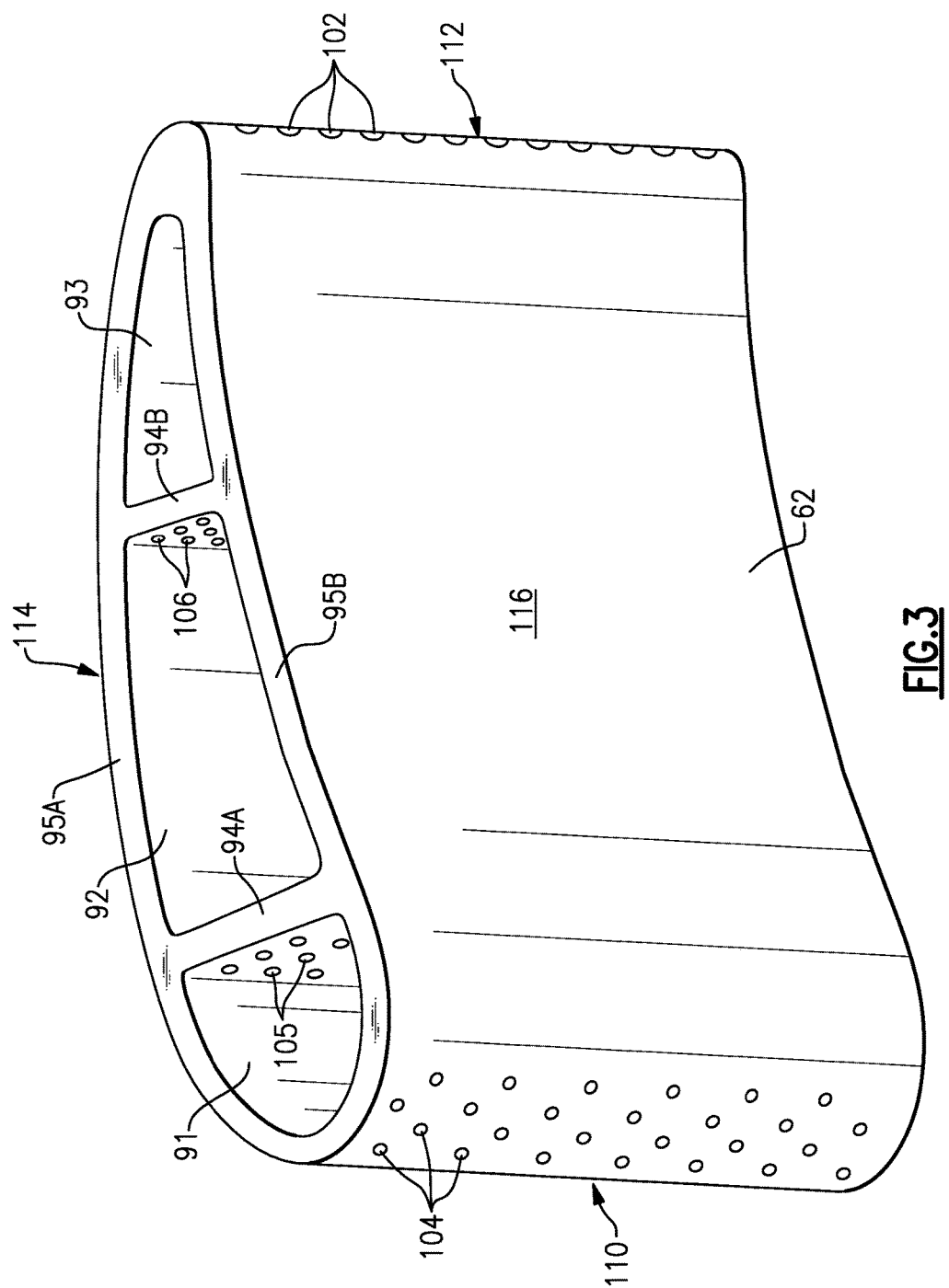
FIG. 3 schematically illustrates a turbine vane having an internal cavity.

FIG. 3 schematically illustrates an example airfoil 62, which may be a vane of high pressure turbine 54 (e.g., vane 61) or a vane of low pressure turbine 46, for example. Alternatively, the airfoil 62 could be part of a rotor blade in either of the turbines 46, 54. The airfoil 62 has a leading edge 110, a trailing edge 112, a suction side 114, and a pressure side 116. The leading edge 110 is upstream of the trailing edge 112. The airfoil 62 includes a plurality of internal cavities 91, 92, 93. Cavity 92 is at least partially defined by interior cavity walls 94A-B and 95A-B.

Figure 4:
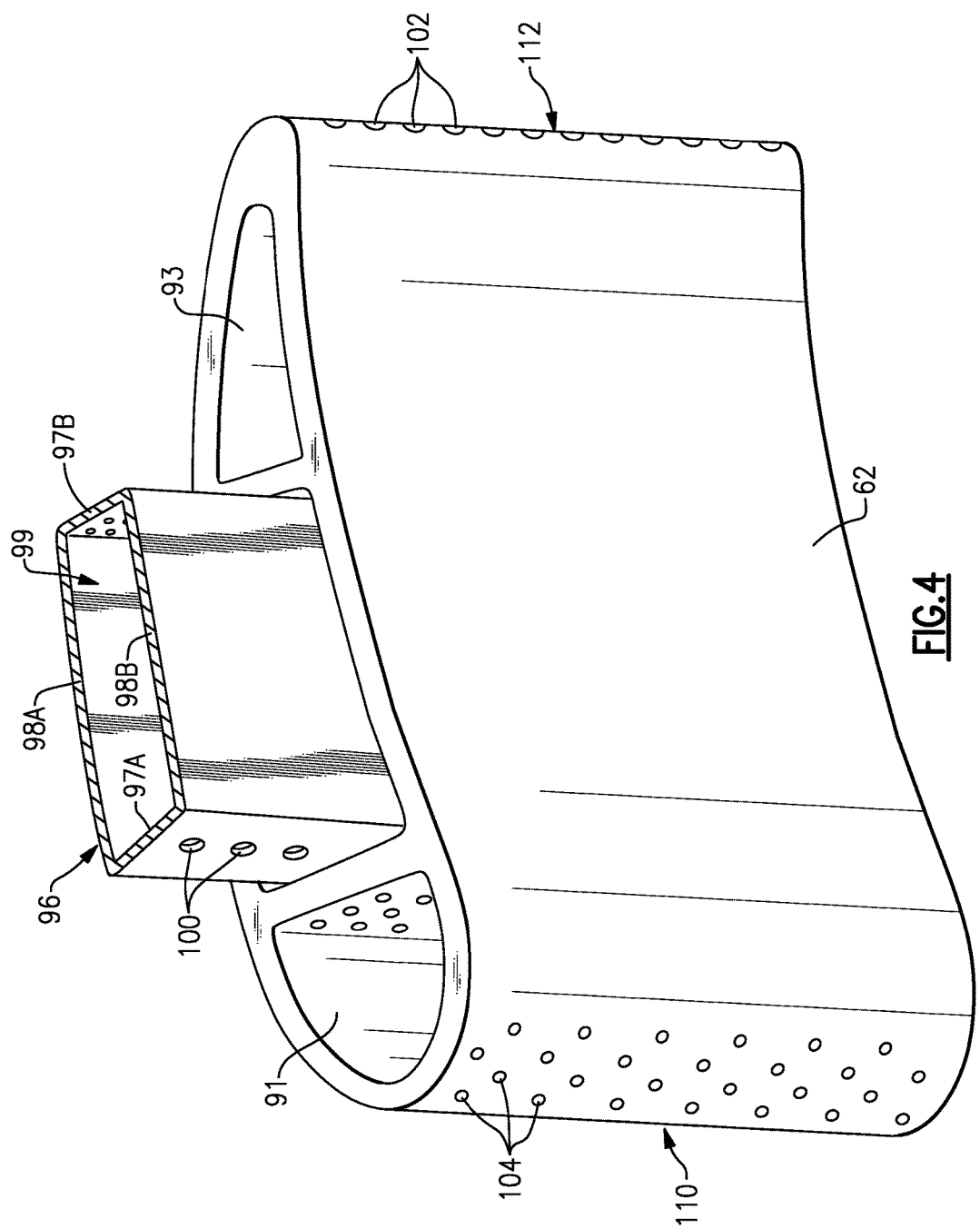
FIG. 4 schematically illustrates a baffle partially inserted into the internal cavity of FIG. 3.
Figure 5A:
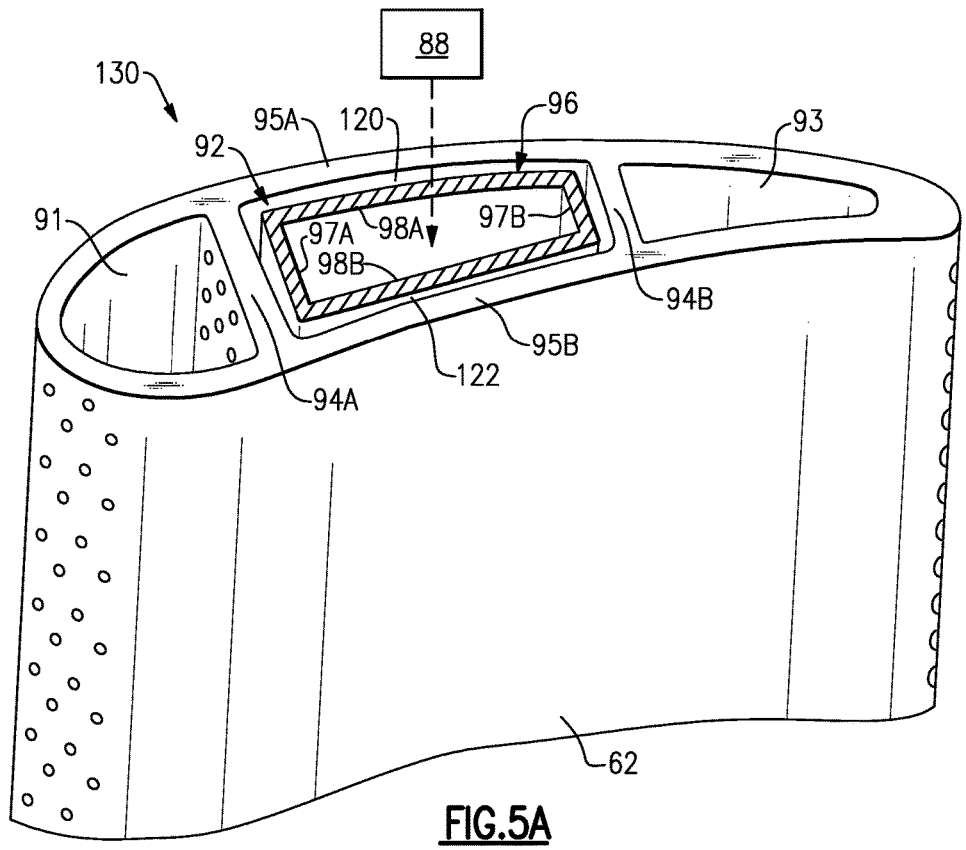
FIG. 5A schematically illustrates the baffle fully inserted into the internal cavity of FIG. 3.

As shown in FIGS. 4 and 5A, a baffle 96 is mounted within cavity 92 to provide cooling for the cavity walls 94A-B, 95A-B. FIG. 4 schematically shows the baffle 96 partially inserted into cavity 92, and FIG. 5A schematically shows the baffle 96 fully inserted into the cavity to form an assembly 130.

The baffle 96 includes at least four longitudinal walls, which include a pair of opposing first sidewalls 97A-B, and a pair of opposing second sidewalls 98A-B. As shown in FIG. 5A, the two first sidewalls 97A-B face the leading edge 110 and the trailing edge 112 of the airfoil 62, respectively, and sidewall 97A is upstream of sidewall 97B. Also, each of the first two sidewalls 97A-B extends along a respective direction having a major component between a suction side 114 and a pressure side 116 of the airfoil 62. The two second sidewalls 98A-B face the suction side 114 and the pressure side 116 of the airfoil 62, respectively. Also, each of the second sidewalls 98A-B extends along a respective direction having a major component between a leading edge 110 and a trailing edge 112 of the airfoil 62.

Figure 5B:
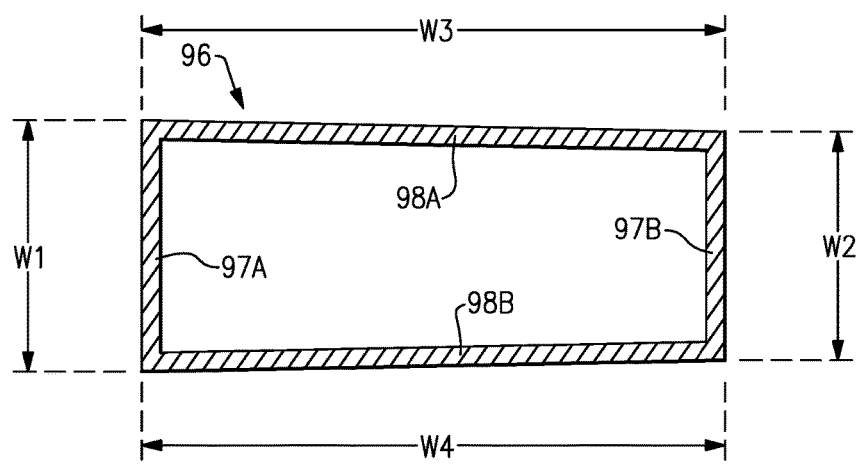
FIG. 5B schematically illustrates another view of the baffle.

In the example of FIG. 5B, the second sidewalls 98A-B extend over widths W3, W4 that are wider than the widths W1, W2 of the first sidewalls 97A-B. However, it is understood that other configurations could be used (e.g., the second sidewalls 98A-B extending over widths that are a same as or narrower than the widths of the first sidewalls 97A-B).

Returning to FIG. 4, the baffle 96 includes a plurality of openings 100 for directing cooling air within the cavity 92. A majority of the openings are on at least one of the first sidewalls 97A-B. In one or more embodiments, at least 90% of the openings are on at least one of the first sidewalls 97A-B. In some embodiments, all of the openings are on at least one of the first sidewalls 97A-B, and the second sidewalls 98A-B are free of the openings for directing cooling air.

Figure 6A:
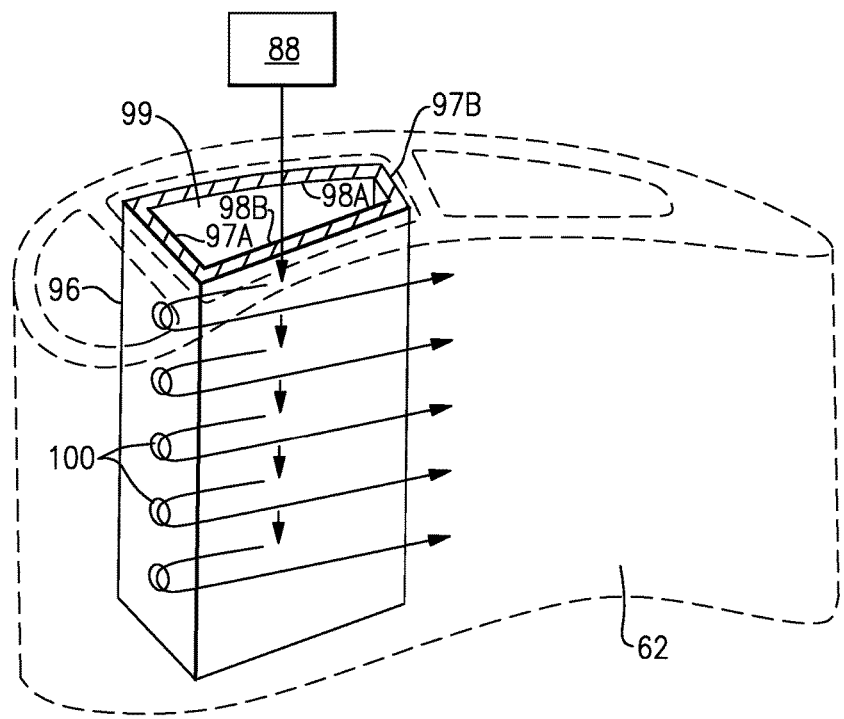
FIG. 6A schematically illustrates an airflow configuration for a cooling assembly that includes the turbine vane and baffle.
Figure 6B:
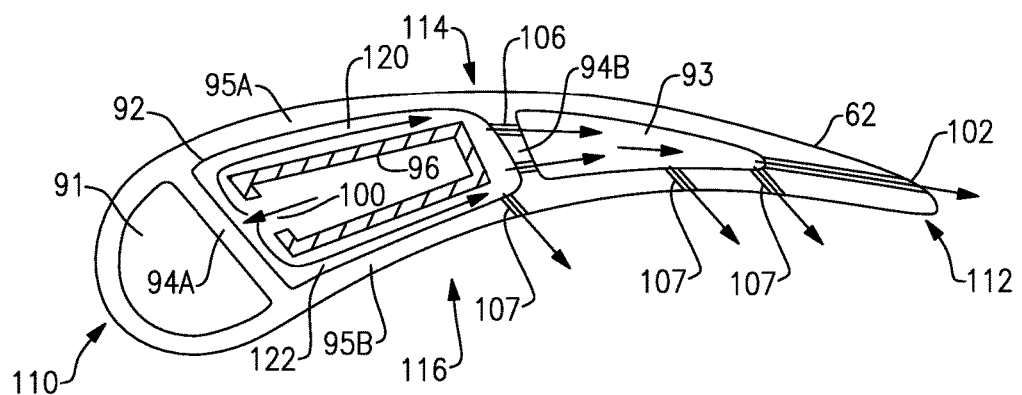
FIG. 6B schematically illustrates another view of the airflow configuration of FIG. 6A.

In one or more embodiments, this configuration facilitates the airflow shown in FIGS. 6A-B, in which the airflow from a source 88 of cooling air enters the baffle 96 through an inlet opening 99 and exits the baffle 96 through holes 100 in sidewall 97A and then flows in a first passage 120 between baffle sidewall 98A and cavity wall 95A, and also a second passage 122 between baffle sidewall 98B and cavity wall 95B towards cavity wall 94B at the aft end of the cavity 92 (see also FIG. 5A). This airflow is also shown in FIG. 6B. Thus, the baffle holes 100 act as inlets to the passages 120, 122 described above. In the embodiment of FIGS. 6A-B, both second sidewalls 98A-B are free of openings for directing cooling air. Thus, the cooling holes 100 are not perpendicular to the cavity walls 95A-B that are being cooled. Instead, cooling holes 100 are situated away from those walls 95A-B, which facilitates an airflow that is more fully developed by the time it reaches the hot surface of walls 95A-B. Instead of requiring impingement holes in the sidewalls 98A-B to cool cavity walls 95A-B as was done in the prior art, the sidewalls 98A-B may be free of openings for directing cooling air, because the baffle 96 provides the flow described above which provides an evenly distributed cooling for the walls 95A-B. Although FIG. 6A illustrates an airflow along only one of the sidewalls 98A-B, it is understood that an airflow could occur along both of the sidewalls 98A-B, as shown in FIG. 6B.

Referring to FIG. 6B, the cavity 93 which is situated between cavity 92 and a trailing edge 112 of the airfoil 62 may be configured as an exhaust chamber that is in fluid communication with the cavity 92 via openings 106, and may also include openings 102 along the trailing edge 112 of the airfoil 62 that permit air to flow from the cavity 92 to an exterior of the airfoil 62. As shown in FIG. 6B, a pressure side 116 of the airfoil 62 may include a plurality of exit holes 107 that also define passages for air to exit the cavity 92.

Referring again to example of FIG. 3, the cavity 91 may also serve as a source of cooling air for the cavity 92, as air can enter the cavity 91 through openings 104 at the leading edge 110 of airfoil 62, and openings 105 in cavity wall 94A, further contributing to airflow in passages 120, 122 between the baffle 96 and cavity walls 95A-B. The openings 104, 105 at least partially define air passages into the cavity 92 via cavity 91.

Figure 7:
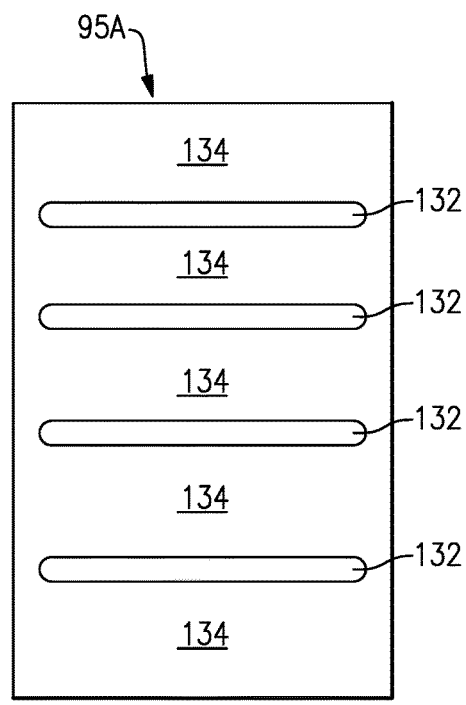
FIG. 7 schematically illustrates a plurality of dividers on a wall of the cavity of FIG. 3.

The cooling assembly 130 may also include a plurality of dividers 132 situated on the cavity wall 95A that form a plurality of chambers 134 in the passages 120, 122 (see FIG. 7). The wall 95B may have similar structure. The chambers 134 direct cooling air that exits a first one of the first sidewalls 97A-B into the passages 120, 122 towards an opposing second one of the first sidewalls 97A-B. Additional dividers that are aligned with the dividers 132 may be situated on cavity walls 94A-B to further define the chambers 134. In one or more embodiments, the dividers 132 are configured as trip strips that add turbulence to airflow within the passages 120, 122. Alternatively, or in combination, the dividers 132 are situated on an exterior of walls 98A-B of the baffle 96 (and optionally also an exterior of walls 97A-B). Although the exterior of sidewalls 97A-B and/or 98A-B and the interior of sidewalls 94A-B and/or 95A-B could be substantially flat within the chambers 134, alternate embodiments would be possible. For example, shapes, patterns, trip strips, and/or dimples could be included on any combination of these sidewalls to add turbulence and further improve heat transfer within the chambers 134.

Figure 8:
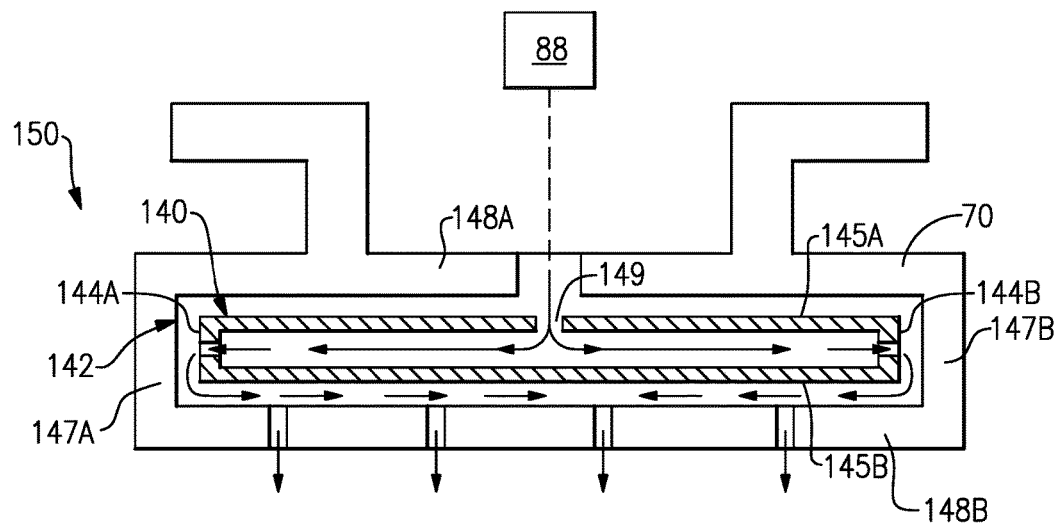
FIG. 8 schematically illustrates an outer air seal cooling embodiment.
Figure 9A:
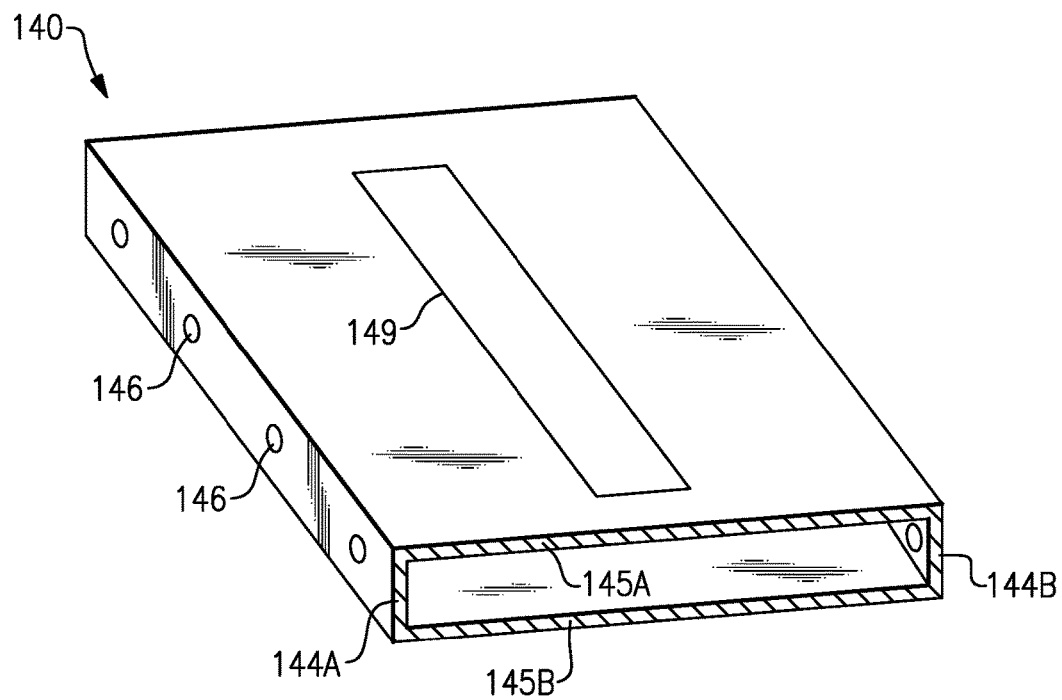
FIG. 9A schematically illustrates a baffle used with the embodiment of FIG. 8.
Figure 9B:
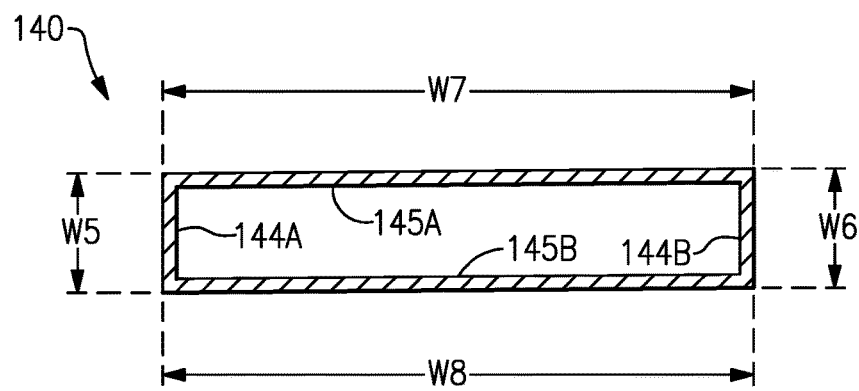
FIG. 9B schematically illustrates another view of the baffle of FIG. 9A.

A similar cooling configuration to the one described above may also be implemented for the blade outer air seal 70 of FIG. 2. Referring now to FIG. 8, the blade outer air seal 70 includes a first pair of opposing sidewalls 147A-B and a second pair of opposing sidewalls 148A-B. Sidewall 147A is upstream of sidewall 147B. The blade outer air seal 70 defines a cavity 142 that is in fluid communication with a source of cooling air 88. A baffle 140 shown in FIGS. 8 and 9A-B is situated within the cavity 142 and includes at least four longitudinal walls, which include a pair of opposing first sidewalls 144A-B, and a pair of opposing second sidewalls 145A-B. As shown in FIG. 9B, the second sidewalls 145A-B extend over widths W7, W8 that are wider than the widths W5, W6 of the first sidewalls 144A-B. When the baffle 140 is situated in the blade outer air seal 70, sidewall 144A is upstream of sidewall 144B in the gas turbine engine 20. Also, sidewall 145B faces radially inward, towards the core flow path C of FIGS. 1-2, and sidewall 145A, which includes opening 149, faces radially outward, away from the core flow path C. The baffle 140 and blade outer air seal 70 form an assembly 150.

The baffle 140 includes plurality of openings 146 for directing cooling air within the cavity 142. A majority of the openings are on at least one of the first sidewalls 144A-B. In one or more embodiments, at least 90% of the openings are on at least one of the first sidewalls 144A-B. In some embodiments, all of the openings are on at least one of the first sidewalls 144A-B, and the second sidewalls 145A-B are free of the openings. Sidewall 145A includes a longitudinal opening 149 that fluidly connects the air source 88 to an interior of the baffle 140. Shapes, patterns, trip strips, and/or dimples could be included on any of the exterior of sidewalls 144A-B, 145A-B and the interior of sidewalls 147A-B, 148A-B to add turbulence and further improve heat transfer for the blade outer air seal 70.

A common aspect of both of the airfoil 62 and blade outer air seal 70 embodiments is that airflow is communicated into the inlet opening of the baffle in question in a first direction, and the airflow is directed along the second sidewalls to be cooled in a second direction that differs from the first direction. For example, in FIGS. 4-6, airflow enters the baffle 96 through inlet opening 99 in a first direction (e.g., approximately perpendicular to engine central longitudinal axis A), and is then directed in passages 120, 122 in a direction that differs from the first direction (e.g., approximately parallel to axis A). Also, in FIGS. 8, 9A, and 9B, airflow enters the baffle 140 through opening 149 along a first direction (e.g., approximately perpendicular to axis A), and then is directed along sidewall 148B in a direction that is transverse to the first direction (e.g., approximately parallel to central axis A).

Another common aspect of the airfoil 62 and blade outer air seal 70 embodiments is that at least one of the first sidewalls 97A-B, 144A-B in each embodiment is upstream of the other of the sidewalls, and that at least one of the second sidewalls 98A-B, 145A-B faces toward the core flow path C of the gas turbine engine 20. In the example of FIG. 4, both of the second sidewalls 98A-B face towards the core flow path C. In the example of FIG. 8, sidewall 145B faces towards the core flow path C and sidewall 145A faces away from the core flow path C.

Although the baffles 96, 140 and techniques discussed above have been presented in the context of a high pressure turbine 54, it is understood that these teachings are equally applicable to a low pressure turbine 46 of the gas turbine engine 20. It is further understood that these teachings could be applicable to airfoils that are part of rotor blades instead of turbine vanes. Also, it is understood that variations would be possible. For example, openings for directing cooling air may be included in just one of the sidewalls 97A, 97B, or may be included in both of the sidewalls. The same applies to sidewalls 144A, 144B. As another example, in some embodiments one of the second sidewalls 98A-B may include openings that fluidly connect an interior of the baffle 96 to the passages 120 or 122, as long as a majority of the openings are still in the first sidewalls 97A-B. Similarly, second sidewall 145B may include openings for directing cooling air, as long as a majority of such openings are situated on at least one of the first sidewalls 144A-B.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An engine component for a gas turbine engine comprising:
   an internal cavity defined by the engine component, the internal cavity in fluid communication with a source of cooling air; and
   a baffle disposed within the internal cavity, the baffle including at least four longitudinal sidewalls that include at least two first sidewalls, one of which is upstream and one of which is downstream, and at least two second sidewalls, at least one of which faces towards a core flow path of the gas turbine engine, the baffle including a plurality of openings for directing cooling air from within the baffle into the cavity, wherein a majority of the openings are on the two first sidewalls, wherein the engine component is an airfoil, each of the two first sidewalls extends along a respective direction having a major component between suction and pressure sides of the airfoil, and each of the two second sidewalls extends along a respective direction having a major component between a leading edge and a trailing edge of the airfoil;
   a first additional cavity defined by the engine component, disposed between the internal cavity and the leading edge of the airfoil, and separated from the internal cavity by a first divider; and
   a second additional cavity defined by the engine component, disposed between the internal cavity and the trailing edge of the airfoil, and separated from the internal cavity by a second divider.

2. The engine component of claim 1, wherein at least 90% of the openings are on the first sidewalls.

3. The engine component of claim 2, wherein all of the openings are on the first sidewalls, and the second sidewalls are free of the openings.

4. The engine component of claim 1, wherein a pressure side of the airfoil includes a plurality of exit holes that define passages for air to exit the internal cavity.

5. The engine component of claim 1, wherein the airfoil is a turbine vane.

6. The engine component of claim 1, comprising a plurality of chamber dividers situated on at least one of a wall of the cavity that at least partially defines the cavity and an exterior of the baffle, wherein the chamber dividers form a plurality of chambers that direct cooling air that exits a first one the first sidewalls along the second sidewalls towards an opposing second one of the first sidewalls.

7. The engine component of claim 1, wherein the engine component is part of a high pressure turbine of the gas turbine engine.

8. The engine component of claim 1, wherein a leading edge of the airfoil and the first divider include cooling openings that fluidly connect the internal cavity to an additional source of cooling air.

9. An engine component for a gas turbine engine comprising:
   an internal cavity defined by the engine component, the internal cavity in fluid communication with a source of cooling air; and
   a baffle disposed within the internal cavity, the baffle including at least four longitudinal sidewalls that include at least two first sidewalls, one of which is upstream and one of which is downstream, and at least two second sidewalls, at least one of which faces towards a core flow path of the gas turbine engine, the baffle including a plurality of openings for directing cooling air from within the baffle into the cavity, wherein a majority of the openings are on the two first sidewalls;
   wherein the engine component is a blade outer air seal adjacent to an airfoil;
   wherein the two first sidewalls face towards a leading edge side and a trailing edge side, respectively, of the airfoil; and
   wherein a first one of the second sidewalls faces towards the core flow path, and a second one of the second sidewalls faces away from the core flow path.

10. The engine component of claim 9, comprising an opening in the second one of the second sidewalls, the opening fluidly connecting the source of cooling air to the internal cavity.

11. The engine component of claim 9, wherein the first sidewalls and second sidewalls extend between opposing open ends of the baffle.

12. A gas turbine engine, comprising:
   a compressor section;
   a combustor section in fluid communication with the compressor section;
   a turbine section in fluid communication with the combustor section, the turbine section including an engine component defining an internal cavity in fluid communication with a source of cooling air; and
   a baffle disposed within the internal cavity, the baffle including at least four longitudinal sidewalls that include at least two first sidewalls, one of which is upstream and one of which is downstream, and at least two second sidewalls, at least one of which faces towards a core flow path of the gas turbine engine, the baffle including a plurality of openings for directing cooling air from within the baffle into the cavity, wherein a majority of the openings are on the two first sidewalls, wherein the engine component is an airfoil, each of the two first sidewalls extends along a direction having a major component between suction and pressure sides of the airfoil, and each of the two second sidewalls extends along a direction having a major component between a leading edge and a trailing edge of the airfoil;
   a first additional cavity defined by the engine component, disposed between the internal cavity and the leading edge of the airfoil, and separated from the internal cavity by a first divider; and
   a second additional cavity defined by the engine component, disposed between the internal cavity and the trailing edge of the airfoil, and separated from the internal cavity by a second divider.

13. The gas turbine engine of claim 12, wherein at least 90% of the openings are on the first sidewalls.

14. The gas turbine engine of claim 13, wherein all of the openings are on the first sidewalls, and the second sidewalls are free of the openings.

15. The gas turbine engine of claim 12, wherein a pressure side of the airfoil includes a plurality of exit holes that define passages for air to exit the internal cavity.

16. The gas turbine engine of claim 12, wherein the airfoil is a turbine vane.

17. The gas turbine engine of claim 12, comprising a plurality of chamber dividers situated on at least one of a wall of the cavity that at least partially defines the cavity and an exterior of the baffle, wherein the chamber dividers form a plurality of chambers that direct cooling air that exits a first one the first sidewalls along the second sidewalls towards an opposing second one of the first sidewalls.

18. The gas turbine engine of claim 12, wherein the engine component is part of a high pressure turbine of the gas turbine engine.

19. The gas turbine engine of claim 12, wherein the leading edge of the airfoil and the first divider include cooling openings that fluidly connect the internal cavity to an additional source of cooling air.

20. A gas turbine engine, comprising:
   a compressor section;
   a combustor section in fluid communication with the compressor section;
   a turbine section in fluid communication with the combustor section, the turbine section including an engine component defining an internal cavity in fluid communication with a source of cooling air; and
   a baffle disposed within the internal cavity, the baffle including at least four longitudinal sidewalls that include at least two first sidewalls, one of which is upstream and one of which is downstream, and at least two second sidewalls, at least one of which faces towards a core flow path of the gas turbine engine, the baffle including a plurality of openings for directing cooling air from within the baffle into the cavity, wherein a majority of the openings are on the two first sidewalls;
   wherein the engine component is a blade outer air seal adjacent to an airfoil;
   wherein the two first sidewalls face towards a leading edge side and a trailing edge side, respectively, of the airfoil; and
   wherein a first one of the second sidewalls faces towards the core flow path, and a second one of the second sidewalls faces away from the core flow path.

21. The gas turbine engine of claim 20, comprising an opening in the second one of the second sidewalls, the opening fluidly connecting the source of cooling air to the internal cavity.

22. The gas turbine engine of claim 20, wherein the first sidewalls and second sidewalls extend between opposing open ends of the baffle.

23. An engine component for a gas turbine engine comprising:
- an airfoil comprising a plurality of cavities separated by cavity walls, including a second cavity disposed between first and third cavities, wherein the plurality of cavities are in fluid communication with each other through a plurality of openings in the cavity walls, and the second cavity is in fluid communication with a source of cooling air;
- a baffle disposed within the second cavity, the baffle including at least four longitudinal sidewalls that include at least two first sidewalls, one of which is upstream and one of which is downstream, and two second sidewalls that face towards a core flow path of the gas turbine engine, the baffle including a plurality of baffle openings for directing cooling air from within the baffle into the second cavity, including a plurality of openings in the upstream first sidewall, wherein a majority of the baffle openings are on at least one of the first sidewalls; and
- a plurality of dividers within the second cavity that define a plurality of channels in the second cavity that extend between the first and third cavities and directing cooling air that exits the upstream first sidewall towards the downstream first sidewall.

\* \* \* \* \*